United States Patent
Yamazaki et al.

(10) Patent No.: US 11,383,378 B2
(45) Date of Patent: Jul. 12, 2022

(54) GRASPING APPARATUS, LEARNING APPARATUS, LEARNED MODEL, GRASPING SYSTEM, DETERMINATION METHOD, AND LEARNING METHOD

(71) Applicants: SHINSHU UNIVERSITY, Matsumoto (JP); TOYOTA JIDOSHA KABUSHIKI KAISHA, Toyota (JP)

(72) Inventors: Kimitoshi Yamazaki, Nagano (JP); Kazuki Sano, Nagano (JP); Satonori Demura, Nagano (JP); Wataru Nakajima, Nagano (JP); Keisuke Takeshita, Nagoya (JP)

(73) Assignees: SHINSHU UNIVERSITY, Matsumoto (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/214,556

(22) Filed: Dec. 10, 2018

(65) Prior Publication Data
US 2019/0184554 A1    Jun. 20, 2019

(30) Foreign Application Priority Data

Dec. 18, 2017 (JP) .............................. JP2017-241555

(51) Int. Cl.
*B25J 9/16* (2006.01)
*G06T 1/00* (2006.01)
*G06T 7/70* (2017.01)

(52) U.S. Cl.
CPC ............. *B25J 9/163* (2013.01); *B25J 9/1612* (2013.01); *B25J 9/1669* (2013.01); *B25J 9/1697* (2013.01);
(Continued)

(58) Field of Classification Search
CPC ........ B25J 9/163; B25J 9/1697; B25J 9/1612; B25J 9/1669; B25J 13/00; B25J 11/008;
(Continued)

(56) References Cited

U.S. PATENT DOCUMENTS

| | | | | |
|---|---|---|---|---|
| 5,380,147 A | * | 1/1995 | Hess ...................... | B65G 61/00 414/796 |
| 9,427,874 B1 | * | 8/2016 | Rublee ................. | B25J 11/0075 |

(Continued)

FOREIGN PATENT DOCUMENTS

| | | | |
|---|---|---|---|
| FR | 3096672 A1 * | 12/2020 | ............. B65G 47/90 |
| JP | 2009-279700 A | 12/2009 | |

(Continued)

OTHER PUBLICATIONS

JP-2020169092-A translation (Year: 2020).*

(Continued)

*Primary Examiner* — Jeff A Burke
*Assistant Examiner* — Kyle T Johnson
(74) *Attorney, Agent, or Firm* — Oblon, McClelland, Maier & Neustadt, L.L.P.

(57) ABSTRACT

A grasping apparatus 1 includes: an image data acquisition unit 16; a robot arm 11; a control unit 12; and a grasping position determination unit 18 configured to determine, using the image data of photographed flexible objects in a folded and stacked state that is acquired by the image data acquisition unit 16, whether or not a part of the flexible objects in that image data is suitable for being grasped. The control unit 12 controls the robot arm 11 so as to deform ends of a top surface of the flexible object at the top of the stacked flexible objects. The grasping position determination unit 18 determines whether or not a part is suitable for (Continued)

being grasped using the image data of the photographed flexible object the ends of the top surface of which have been deformed.

7 Claims, 10 Drawing Sheets

(52) U.S. Cl.
CPC .............. *G06T 1/0014* (2013.01); *G06T 7/70* (2017.01); *G06T 2207/10012* (2013.01); *G06T 2207/10028* (2013.01); *G06T 2207/20084* (2013.01)

(58) Field of Classification Search
CPC .......... B25J 9/161; G06T 1/0014; G06T 7/70; G06T 2207/10012; G06T 2207/10028; G06T 2207/20084; G06K 9/00691; G06K 9/6256; G06N 3/0454
See application file for complete search history.

(56) References Cited

U.S. PATENT DOCUMENTS

| | | | | |
|---|---|---|---|---|
| 9,981,379 | B1* | 5/2018 | Youmans | B25J 15/00 |
| 10,759,054 | B1* | 9/2020 | Patil | G06T 1/0014 |
| 10,981,272 | B1* | 4/2021 | Nagarajan | B25J 9/1669 |
| 2001/0056313 | A1* | 12/2001 | Osborne, Jr. | B25J 13/003 |
| | | | | 700/245 |
| 2005/0218679 | A1* | 10/2005 | Yokoyama | B25J 15/10 |
| | | | | 294/99.1 |
| 2010/0126118 | A1* | 5/2010 | Actis | B65D 33/001 |
| | | | | 53/459 |
| 2012/0060735 | A1* | 3/2012 | Dickerson | D05B 27/08 |
| | | | | 112/313 |
| 2013/0249157 | A1* | 9/2013 | Endo | B25J 9/026 |
| | | | | 269/56 |
| 2015/0293592 | A1 | 10/2015 | Cheong et al. | |
| 2016/0167227 | A1* | 6/2016 | Wellman | B25J 9/1612 |
| | | | | 700/259 |
| 2017/0282634 | A1* | 10/2017 | Jones | B43M 3/02 |
| 2019/0184554 | A1* | 6/2019 | Yamazaki | B25J 9/1612 |
| 2021/0032030 | A1* | 2/2021 | Kalouche | B25J 9/163 |

FOREIGN PATENT DOCUMENTS

| | | |
|---|---|---|
| JP | 5952136 | 7/2016 |
| JP | 2017-30135 A | 2/2017 |
| JP | 2020169092 A * | 10/2020 |

OTHER PUBLICATIONS

FR-3096672-A1 translation (Year: 2020).*
Robot plays blackjack dealer at Automate 2013 (Year: 2013).*
Gualtieri, M. et al., "High precision grasp pose detection in dense clutter", arXiv preprint arXiv: 1603.01564, 2016, 8 pages.
Jeremy Maitin-Shepard et al., "Cloth Grasp Point Detection based on Multiple-View Geometric Cues with Application to Robotic Towel Folding", 2010 IEEE International Conference on Robotics and Automation Anchorage Convention District May 3-8, 2010, 8 pages.
Yuba, H. and Yamazaki, K., "Unfolding an Item of Rectangular Clothing Using a Single Arm and an Assistant Instrument", 2014 IEEE/SICE International Symposium on System Integration, XP032731482, Dec. 13, 2014, pp. 571-576.

* cited by examiner

GRASPING APPARATUS, LEARNING APPARATUS, LEARNED MODEL, GRASPING SYSTEM, DETERMINATION METHOD, AND LEARNING METHOD

CROSS REFERENCE TO RELATED APPLICATIONS

This application is based upon and claims the benefit of priority from Japanese patent application No. 2017-241555, filed on Dec. 18, 2017, the disclosure of which is incorporated herein in its entirety by reference.

BACKGROUND

The present disclosure relates to a grasping apparatus, a learning apparatus, a learned model, a grasping system, a determination method, and a learning method.

A technique for grasping an object using machine learning has been known. For example, in Marcus Gualtieri, Andreas ten Pas, Kate Saenko, and Robert Platt, "High precision grasp pose detection in dense clutter", arXiv preprint arXiv: 1603.01564, 2016., a grasping apparatus generates candidates of grasping postures such that point groups of a gripper and an object come into contact with each other and sufficient object point groups are in the gripper. Then, this grasping apparatus determines whether or not the generated candidate of grasping posture is suitable for grasping using a CNN (Convolutional Neural Network).

SUMMARY

When machine learning using image data is used for determining a grasping position of flexible objects in a folded and stacked state, it may be difficult to determine a suitable grasping position. The inventors have found that since a regular stacked pattern appears on the side surface of the flexible objects in the above state and the difference between an image of a part suitable for being grasped and that of a part unsuitable for being grasped is not sufficient, it is difficult to determine a suitable grasping position.

A first exemplary aspect is a grasping apparatus including: an image data acquisition unit configured to acquire image data of an object being photographed; a grasping unit configured to grasp an object; a control unit configured to control a motion of the grasping unit; and a grasping position determination unit configured to determine, using the image data of photographed flexible objects in a folded and stacked state that is acquired by the image data acquisition unit, whether or not a part of the flexible objects in that image data is suitable for being grasped, in which the control unit controls the grasping unit so as to deform ends of a top surface of the flexible object that is at the top of the stacked flexible objects and the grasping position determination unit determines whether or not a part is suitable for being grasped using the image data of the photographed flexible object the ends of the top surface of which have been deformed.

In this grasping apparatus, the ends of the top surface of the flexible object can be deformed by the grasping unit. Since the deformed forms of the ends which are combined into one end are different from that of the ends which are not combined into one end, a large difference is generated between an image of a part suitable for being grasped and that of a part unsuitable for being grasped. Therefore, with this grasping apparatus, it is possible to determine a suitable grasping position.

In the above exemplary aspect, the grasping apparatus further includes a contact position determination unit configured to determine a position of the flexible object in contact with the grasping unit in order to deform the ends of the top surface using the image data of the photographed flexible objects before the ends of the top surface are deformed, the image data being acquired by the image data acquisition unit, in which for deforming the ends of the top surface, the control unit may perform control so that the grasping unit displaces the flexible object in the contact position determined by the contact position determination unit.

With such a structure, the control for deforming the ends of the top surface of the flexible objects can be performed autonomously.

In the above exemplary aspect, the control unit may control the grasping unit so as to deform the ends of the top surface by making the grasping unit press the flexible object.

With such a structure, it is possible to easily deform the ends of the top surface.

Further, another exemplary aspect is a learning apparatus including: a training data acquisition unit configured to acquire training data including image data of an object being photographed; and a learning calculation unit configured to perform calculation of machine learning using the training data acquired by the training data acquisition unit, in which the image data is image data of flexible objects in a folded and stacked state and includes a first image data and a second image data of the flexible objects the ends of a top surface of which have been deformed from a regular stacked pattern shape, the first image data being image data of the ends of the top surface that are combined into one end by folding the flexible object, the second image data being image data of the ends of the top surface that are not combined into one end by folding the flexible object, and the learning calculation unit calculates to learn a part of the flexible object suitable for being grasped using the training data.

In this learning apparatus, learning is performed using the image data of the flexible objects which have been deformed from a regular stacked pattern shape. Since the deformed forms of the ends which are combined into one end are different from that of the ends which are not combined into one end, learning can be performed using the first and second image data which have a large difference between them for use in learning. Therefore, according to this learning apparatus, it is possible to learn a suitable grasping position.

Further, another exemplary aspect is a learned model for causing a computer to function so as to output grasping suitability of a part of an object as a quantified value based on image data of the object being photographed, in which a weighting coefficient of a neutral network constituting the learned model is learned using training data including the image data of the object being photographed, the image data included in the training data is image data of flexible objects in a folded and stacked state and includes a first image data and a second image data of the flexible objects the ends of a top surface of which have been deformed from a regular stacked pattern shape, the first image data being image data of the ends of the top surface that are combined into one end by folding the flexible object, the second image data being image data of the ends of the top surface that are not combined into one end by folding the flexible object, and the leaned model causing a computer to function so as to perform calculation according to the weighting coefficient for image data of the flexible objects in a folded and stacked state that are input to an input layer of the neutral network and output whether or not a part of the flexible objects in the image data is suitable for being grasped from an output layer of the neutral network.

In this model, learning is performed using the image data of the flexible objects which have been deformed from a regular stacked pattern shape. Since the deformed form of the ends which are combined into one end are different from that of the ends which are not combined into one end, there is a large difference between the first image data and the second image data for use in learning. Therefore, according to this learned model, it is possible to determine a suitable grasping position.

Further, another aspect is a grasping system including: an image pickup device configured to photograph surrounding objects; an image data acquisition unit configured to acquire image data photographed by the image pickup device; a grasping unit configured to grasp an object; a control unit configured to control a motion of the grasping unit; and a grasping position determination unit configured to determine, using the image data of photographed flexible objects in a folded and stacked state that is acquired by the image data acquisition unit, whether or not a part of the flexible objects in that image data is suitable for being grasped, in which the control unit controls the grasping unit so as to deform ends of a top surface of the flexible objects and the grasping position determination unit determines whether or not a part is suitable for being grasped using the image data of the photographed flexible objects the ends of the top surface of which have been deformed.

In this grasping system, the ends of the top surface of the flexible objects can be deformed by the grasping unit. Since the deformed forms of the ends which are combined into one end are different from that of the ends which are not combined into one end, a large difference is generated between an image of a part suitable for being grasped and that of a part unsuitable for being grasped. Therefore, according to this grasping system, it is possible to determine a suitable grasping position.

Further, another exemplary aspect is a determination method for controlling a grasping unit so as to deform ends of a top surface of a plurality of flexible objects in a folded and stacked state and determining whether or not a part of the flexible objects in the image data is suitable for being grasped using the image data of the photographed flexible objects the ends of the top surface of which have been deformed.

In this determination method, the ends of the top surface of the flexible objects can be deformed by the grasping unit. Since the deformed forms of the ends which are combined into one end are different from that of the ends which are not combined into one end, a large difference is generated between an image of a part suitable for being grasped and that of a part unsuitable for being grasped. Therefore, according to this determination method, it is possible to determine a suitable grasping position.

Further, another exemplary aspect is a learning method including: acquiring training data including image data of an object being photographed; and performing calculation of machine learning to determine a part of flexible objects suitable for being grasped using the acquired training data, in which the image data is image data of flexible objects in a folded and stacked state and includes a first image data and a second image data of the flexible objects the ends of a top surface of which have been deformed from a regular stacked pattern shape, the first image data being image data of the ends of the top surface that are combined into one end by folding the flexible object, and the second image data being image data of the ends of the top surface that are not combined into one end by folding the flexible object.

In this learning method, learning is performed using the image data of the flexible objects which are deformed from a regular stacked pattern shape. Since the deformed forms of the ends which are combined into one end are different from that of the ends which are not combined into one end, learning can be performed using the first and second image data which have a sufficient difference between them for use in learning. Therefore, according to this learning method, it is possible to learn a suitable grasping position.

According to the present disclosure, it is possible to provide a grasping apparatus, a learning apparatus, a learned model, a grasping system, a determination method, and a learning method capable of determining a suitable grasping position for flexible objects in a folded and stacked state.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A grasping apparatus 1 according to the embodiment grasps a flexible object whose shape is easily deformed such as cloth and paper products. The grasping apparatus 1 particularly grasps the flexible object which is at the top of a plurality of flexible objects in a folded and stacked state. Note that depending on a part grasped by the grasping apparatus 1, a state of an external appearance of the flexible object changes from a folded state to an unfolded state. That is, when a part to be grasped is not suitable for grasping, the grasping apparatus 1 cannot lift up the flexible object while maintaining the folded state thereof.

Figure 1:
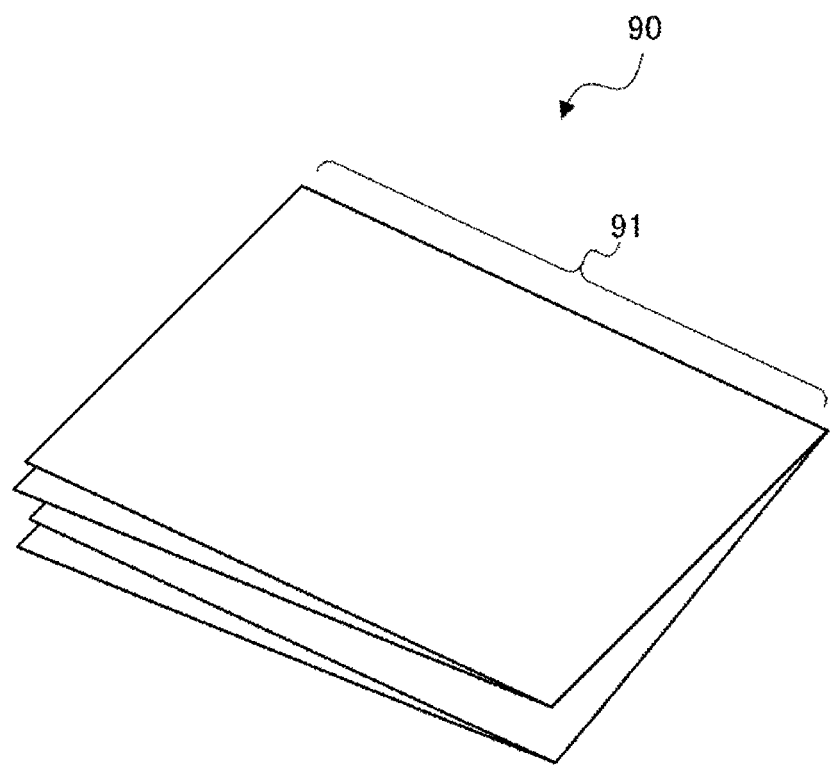
FIG. 1 is a schematic diagram showing an example of an external appearance of a folded flexible object.

FIG. 1 is a schematic diagram showing an example of an external appearance of a folded flexible object 90. Note that FIG. 1 shows an external appearance of the flexible object 90 folded in four as an example. Four side ends of the flexible object 90 have different features as shown in FIG. 1. Ends 91 are ends which are combined into one end by folding the flexible object and other ends are ends which are not combined into one end by folding the flexible object. That is, the ends 91 are ends in which one fold appears in the external appearance of the flexible object and other ends, in contrast, are ends in which a plurality of folds appear or no fold appears in the external appearance of the flexible object. In other words, the ends 91 are ends in which one edge appears in the external appearance of the flexible object and other ends, in contrast, are ends in which two or more edges (when the flexible object is folded in four as shown in FIG. 1, specifically two or four edges) appear in the external appearance of the flexible object. That is, the ends 91 are closed ends, and ends other than the ends 91, in contrast, are opened ends.

When a grasping position is close to the ends 91, it is relatively easy to lift up the flexible object 90 while maintaining the folded state thereof. However, when a grasping position is close to ends other than the ends 91, it is relatively difficult to lift up the flexible object 90 while maintaining the folded state thereof. For example, in the case where an end effector is inserted from the lateral side of the flexible object 90 and the upper and lower sides of the folded flexible object are held and grasped, it is easy to grasp an entire group of a plurality of sheets generated by folding the flexible object when the grasping position is close to the ends 91. However, when the grasping position is close to the ends other than the ends 91, only a part of the group of sheets could be grasped. When only the part of the group of sheets is held and grasped, the folded state cannot be maintained. As described above, for lifting up the flexible object while maintaining the folded state thereof, it is necessary to select a suitable grasping position. In this embodiment, whether or not a part of the flexible object shown in the image is in a position suitable for being grasped, that is, is close to the ends combined into one end by folding the flexible object is identified by machine learning using images. However, when identification is performed using such a method, there are the following problems.

Figure 2A:
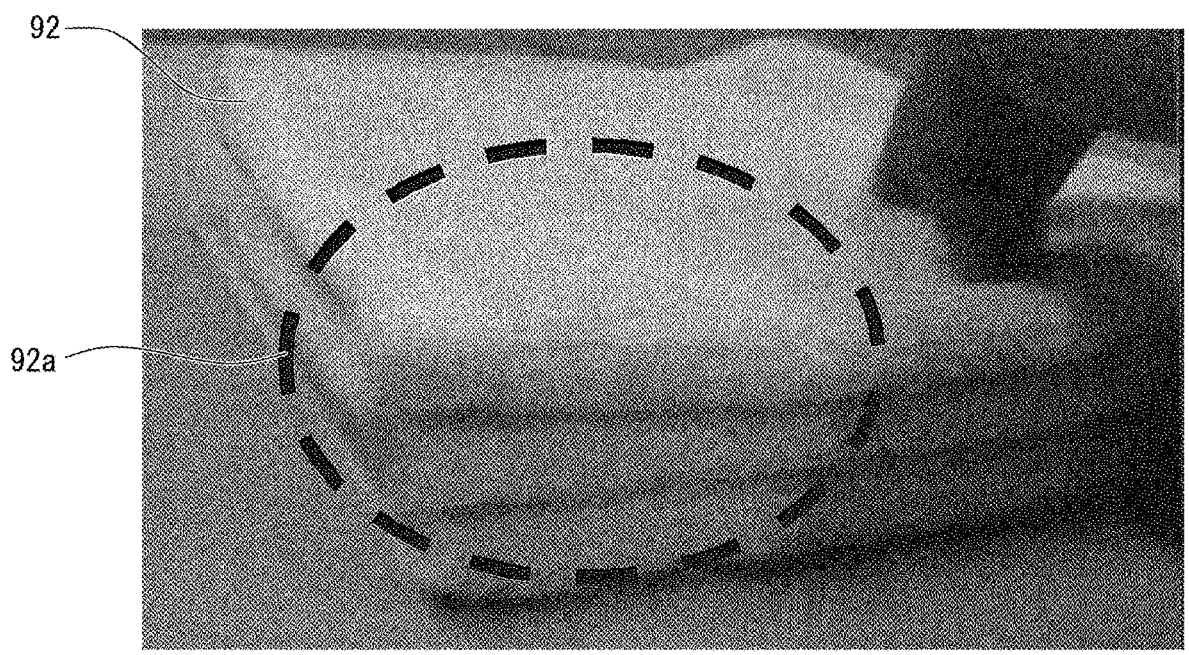
FIG. 2A shows the flexible objects in a folded and stacked state.
Figure 2B:
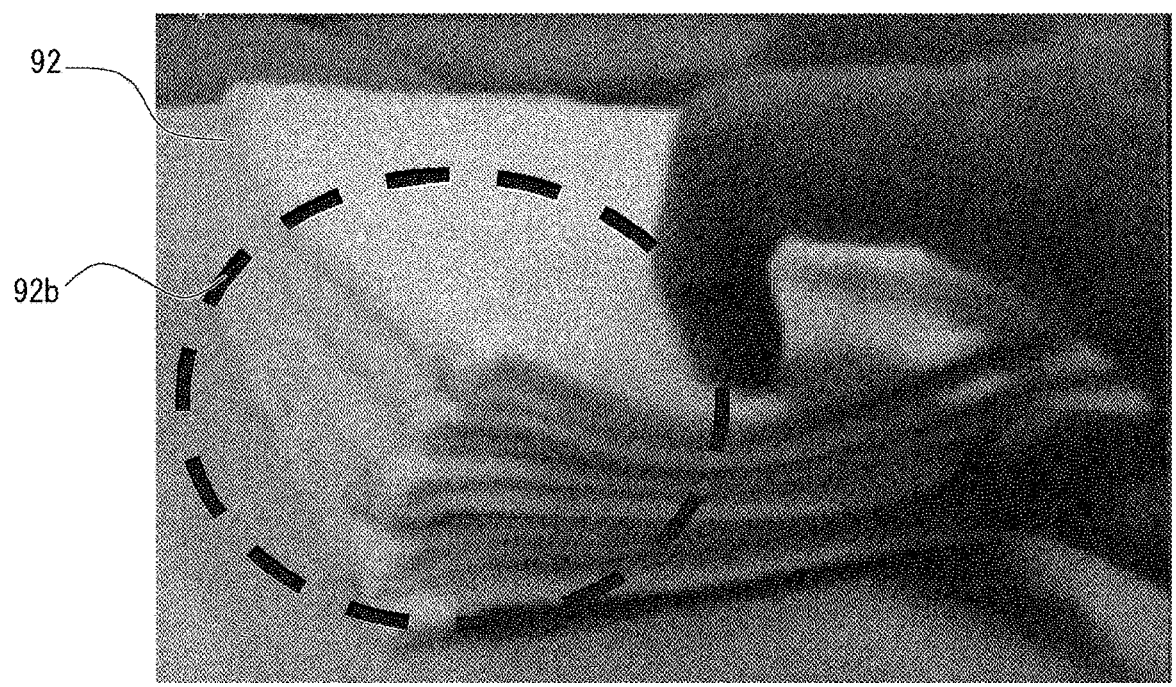
FIG. 2B shows the flexible objects in a folded and stacked state.
Figure 2C:
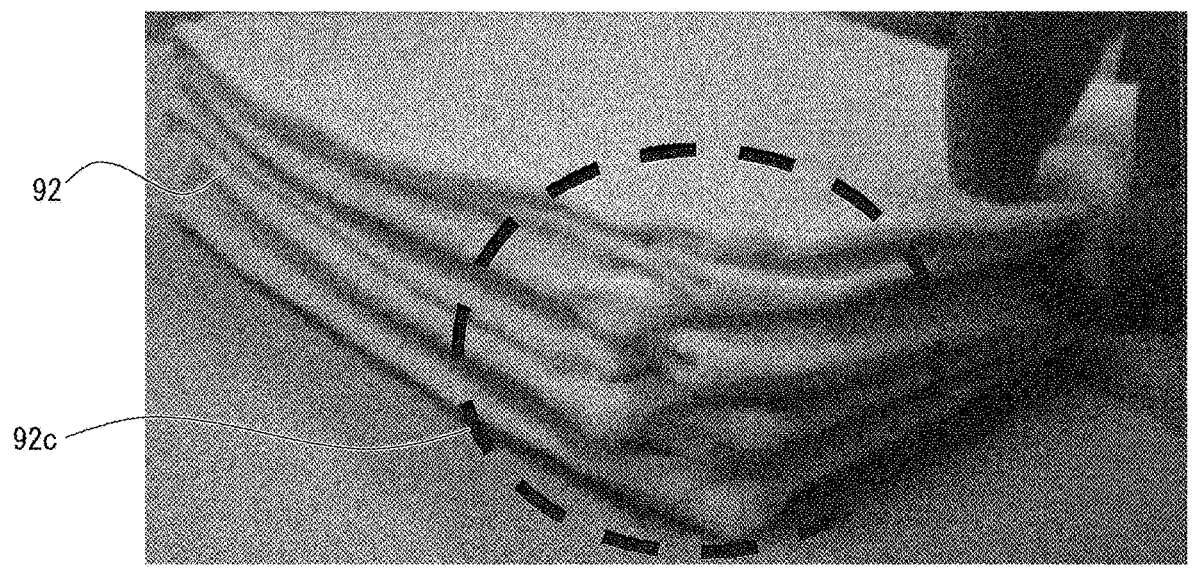
FIG. 2C shows the flexible objects in a folded and stacked state.

FIGS. 2A to 2C show the flexible objects in a folded and stacked state. Specifically, FIGS. 2A to 2C show a state in which a plurality of folded cloth towels 92 are stacked. Note that a mark 92a shows ends combined into one end by folding the cloth towel 92 in FIG. 2A, and marks 92b and 92c show opened ends (i.e., ends not combined into one end) in FIGS. 2B and 2C. Similar regular stacked patterns appear in each of FIGS. 2A to 2C. Therefore, it is difficult to distinguish between the ends shown in FIG. 2A and the ends shown in FIG. 2B or 2C. Accordingly, it is difficult to identify a suitable grasping position. Thus, the grasping apparatus cannot easily lift up the flexible object which is at the top of the stacked flexible objects while maintaining the folded state thereof. For the above reason, in this embodiment, the following techniques for lifting up a flexible object while maintaining the folded state thereof are disclosed. Note that in the following embodiment, the flexible object is folded so as to have ends combined into one end. For example, the flexible object may be folded by repeating being folded in half one or more times, such as folding in half, folding it in four, or folding it in eight. In this case, at the time of (n+1)-th folding, the flexible object may be folded so that a folding, which is perpendicular or parallel to a folding generated at the time of n-th folding, is generated.

Note that the above-described method of folding the flexible object is an example and is not limited thereto.

An embodiment according to the present disclosure will be described hereinafter with reference to the drawings.

Figure 3:
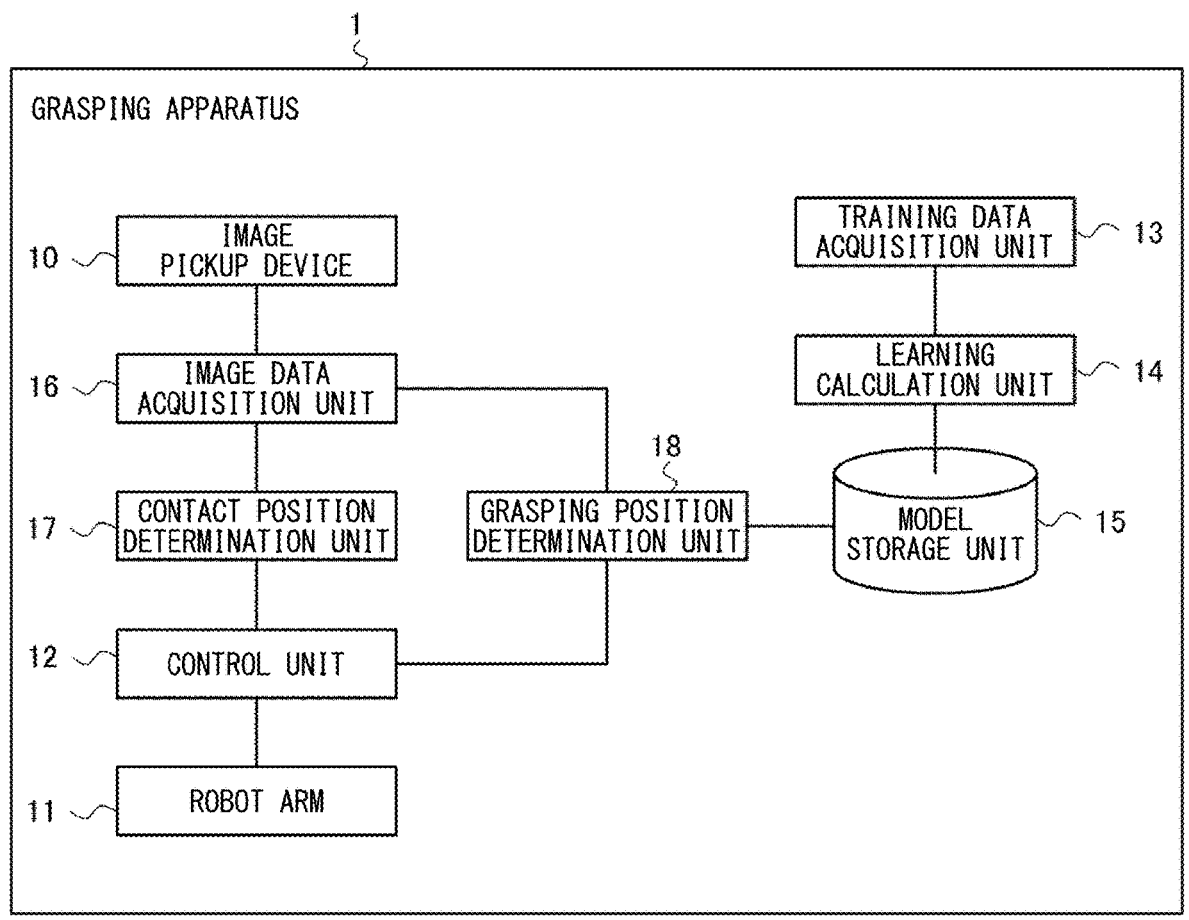
FIG. 3 is a block diagram showing a schematic configuration of a grasping apparatus according to an embodiment.

FIG. 3 is a block diagram showing a schematic configuration of the grasping apparatus 1 according to the embodiment. By the configuration shown in FIG. 3, the grasping apparatus 1 performs: [1] a learning process for generating a learned model based on image data of the flexible object; and [2] a determination process for determining a part suitable for being grasped using the learned model. Note that when the grasping apparatus 1 is considered to be an apparatus for performing a learning process, the grasping apparatus 1 can also be referred to as a learning apparatus.

The grasping apparatus 1 includes: an image pickup device 10; a robot arm 11; a control unit 12; a training data acquisition unit 13; a learning calculation unit 14; a model storage unit 15; an image data acquisition unit 16; a contact position determination unit 17; and a grasping position determination unit 18.

The image pickup device 10 is a device for photographing surrounding objects, and in this embodiment, more specifically, it is a device for generating three-dimensional image information. As a specific configuration of the image pickup device 10, any configurations can be adopted. For example, the image pickup device 10 may be a stereo camera. Further, the image pickup device 10 may include a Time-of-Flight distance sensor such as a laser range finder, or may include a distance sensor using a Light Coding system or the like in which a dot pattern is projected to measure a distance. As described above, the specific configuration of the image pickup device 10 can be any configurations and it is not limited to the configuration according to any one of the above techniques.

Figure 4:
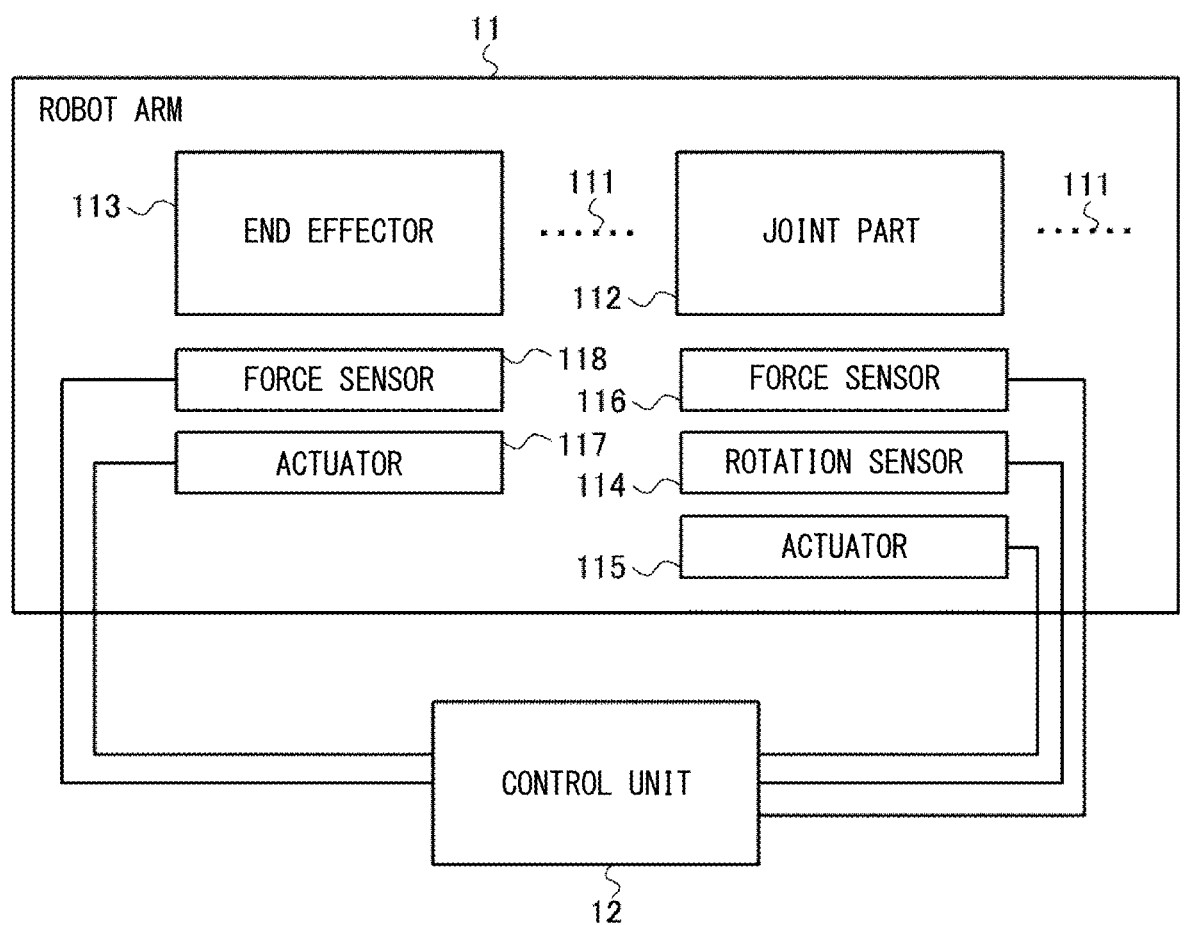
FIG. 4 is a block diagram showing a schematic configuration of a robot arm.

The robot arm 11 is a specific example of a grasping part for grasping an object. As shown in FIG. 4, the robot arm 11, includes, for example: a plurality of links 111; a joint part (a wrist joint, an elbow joint, a shoulder joint, etc.) 112 for rotatably coupling each link 111; and an end effector 113 for grasping a target object.

In each joint part 112, a rotation sensor 114 such as an encoder for detecting rotation information on each joint part 112, an actuator 115 such as a servo motor for driving each joint part 112, and a force sensor 116 for detecting an operation force of each joint part 112 are provided. The force sensor 116, for example, is a torque sensor or the like for detecting torque of each joint part 112. A speed reduction mechanism is provided in each joint part 112. The end effector 113, for example, is composed of a plurality of finger parts or the like and can grasp a target object by holding it with the finger parts. An actuator 117 for driving the end effector 113 and a force sensor 118 for detecting an operation force of the end effector 113 are provided in the end effector 113.

The control unit 12 controls an operation of the robot arm 11. The control unit 12 calculates a trajectory of the robot arm 11 based on a result of the process performed by the contact position determination unit 17 or the grasping position determination unit 18. Further, the control unit 12 moves the robot arm 11 according to the calculated trajectory. Specifically, for example, the control unit 12 feedback-controls the robot arm 11 by controlling the actuators 115 and 117 based on outputs from the rotation sensor 114 and the force sensors 116 and 118.

The training data acquisition unit 13 acquires training data including image data of an object being photographed. The training data acquisition unit 13 may read to acquire the training data previously stored in a storage device such as a memory of the grasping apparatus 1 or may acquire the training data sent from other apparatuses. The learning calculation unit 14 performs calculation of machine learning using the training data acquired by the training data acquisition unit 13. The image data included in the training data, for example, is two-dimensional image data, but may instead be three-dimensional image data.

The training data used in this embodiment will now be described. In this embodiment, the image data included in the training data is image data of the flexible objects in a folded and stacked state, especially image data of the flexible objects the ends of the top surface of which have been deformed from a regular stacked pattern shape. More specifically, in this embodiment, the photographed image data where the ends of the top surface of the flexible object which is at the top of the stacked flexible objects are pressed from the side surface direction is used. Further, as such image data, the image data used for the training data includes the following two types of image data. Note that one of the two types of the image data is referred to as first image data and the other is referred as to second image data.

The first image data is image data of deformed ends being photographed which are combined into one end by folding the flexible object. That is, the first image data is photographed image data where the ends combined into one end by folding the flexible object have been deformed due to a pressing force from the side surface direction. In the training data, a label indicating that it is image data of a part suitable for being grasped is associated with the first image data. The second image data is image data of deformed ends being photographed which are not combined into one end by folding the flexible object. That is, the second image data is photographed image data where the ends other than the ends combined into one end by folding the flexible object have been deformed due to a pressing force from the side surface direction. In the training data, a label indicating that it is image data of a part unsuitable for being grasped is associated with the second image data. Note that the first and the second data may be partial image data cut from the image data.

The learning calculation unit 14 calculates to learn a part of the flexible object suitable for being grasped by using the above-described training data. In this embodiment, as a machine learning model, the CNN (Convolutional Neural Network) is used. More specifically, the CNN YOLO v2 capable of outputting a coordinate position in the image of the part suitable or unsuitable for being grasped and the grasping suitability of the part is used as the machine learning model. Note that other neutral networks capable of outputting grasping suitability of a part of an object as a quantified value based on image data of the object being photographed may be used or other machine learning models may be used. In this embodiment, the learning calculation unit 14 especially calculates parameter values such as a weighting coefficient of a neutral network using the training data. The learning calculation unit 14 stores the learned model in the model storage unit 15 after completing the calculation using the training data.

Accordingly, the following learned model for causing a computer to function so as to output the grasping suitability of a part of the object as a quantified value based on the image data of the object being photographed is stored in the model storage unit 15. That is, the weighting coefficient of the neutral network constituting this learned model is learned using the training data including the image data of the object being photographed. Note that this image data includes the above-described first and second image data. Then, this learned model causes a computer to function so as to perform a calculation according to the weighting coefficient for image data of the flexible objects in a folded and stacked state that are input to an input layer of the neutral network and output whether or not a part of the flexible objects in the image data is suitable for being grasped from an output layer of the neutral network. Note that image data in which the flexible objects in a folded and stacked state is not photographed may be input to the input layer. As described above, the learned model stored in the model storage unit 15 is used as a program module.

The image data acquisition unit 16 acquires image data of an object being photographed. The image data acquisition unit 16 acquires, for example, image data of flexible objects being photographed in a folded and stacked state. In this embodiment, the image data acquisition unit 16 acquires the image data photographed by the image pickup device 10. However, the image data acquisition unit 16 may read to acquire the image data previously stored in a storage device such as a memory of the grasping apparatus 1 or may acquire the image data sent from other apparatuses. Note that in this embodiment, although three-dimensional image data is acquired to control the robot arm 11, it is not always necessary when determining merely a suitable grasping position. That is, even with two-dimensional image data, it is possible to determine a suitable grasping position by the learned model.

The contact position determination unit 17 determines a contact position to deform a flexible object to be grasped using the robot arm 11, which is, more specifically, the end effector 113. More specifically, the contact position determination unit 17 determines a contact position to deform the ends of the top surface of the stacked flexible objects. That is, the contact position determination unit 17 determines a contact position with the robot arm 11 in the flexible object to be grasped when the robot arm 11 displaces the flexible object to be grasped. In this embodiment, the object to be grasped is displaced when it is pressed by the robot arm 11 (the end effector 113). Therefore, in this embodiment, the contact position determination unit 17 determines a contact position for the robot arm 11 to press the flexible object to be grasped. The contact position determination unit 17 determines the contact position using image data acquired by the image data acquisition unit 16 in which the flexible objects before the ends of the top surface thereof are deformed by the robot arm 11 is photographed. Note that details of the determination of the contact positon will be described later with reference to a flowchart.

The grasping positon determination unit 18 determines whether or not a part of the flexible objects in the image data is suitable for being grasped using the image data acquired by the image data acquisition unit 16. That is, the grasping position determination unit 18 uses the image data of the photographed flexible objects in a folded and stacked state to determine whether or not the part of the flexible objects in that image data is suitable for being grasped. Note that grasping position determination unit 18, more specifically, performs the determination using the photographed image data of the flexible objects the ends of the top surface of which have been deformed. Further, at that time, the grasping position determination unit 18 uses the learned model stored in the model storage unit 15. That is, the grasping position determination unit 18 according to this embodiment applies the above-described CNN, in which parameters including a weighting coefficient are previously set, to the image data acquired by the image data acquisition unit 16.

Further, the grasping position determination unit 18 determines areas suitable and unsuitable for being grasped, and outputs the area suitable for being grasped.

The control unit 12 controls the robot arm 11 as described above. The control unit 12 particularly controls the robot arm 11 so as to deform ends of the top surface of the flexible object which is at the top of the stacked flexible objects when determining a grasping position. Specifically, the control unit 12 controls the robot arm 11 so that the ends of the flexible object are deformed by the robot arm 11 pressing with a predetermined force at the contact position determined by the contact position determination unit 17. In this embodiment, the control unit 12 controls the end effector 113 of the robot arm 11 so as to press the ends of the top surface of the flexible object which is at the top of the stacked flexible objects, which is a contact position determined by the contact position determination unit 17, from the side surface direction. Since a motion for the deformation is simply a pressing motion, the deformation can be easily performed.

Note that in this embodiment, the ends of the flexible object are pressed from a lateral direction as described above. However, the robot arm 11 may displace other positions of the flexible object when determining a grasping position. For example, the control unit 12 may control the robot arm 11 so as to press a positon which is a predetermined distance away from the ends of the top surface of the flexible object which is at the top of the stacked flexible objects from above. Further, in this embodiment, the control unit 12 controls the robot arm 11 so as to press the flexible object at a contact position. However, the control unit 12 may displace the flexible object by other motions than the above motions performed by the robot arm 11 for deforming the ends of the flexible object. For example, the deformation of the ends of the flexible object may be performed by the displacement due to other motions such as pulling the flexible object at the contact position determined by the contact position determination unit 17. Note that the image data included in the training data (i.e., the training data used in the learning calculation unit 14) which is used for creating a learned model is image data of the flexible object deformed by using a deformation method the same as that performed by the robot arm 11 when determining a grasping position.

Further, the control unit 12 controls the robot arm 11 so as to grasp the flexible object to be grasped at a grasping position, which is determined by the grasping position determination unit 18 to be a suitable area for being grasped. In this embodiment, the control unit 12 controls the robot arm 11 so as to hold the ends of the flexible object determined to be a suitable area for being grasped from the lateral direction and grasp the flexible object. However, the control unit 12 may hold the vicinity of the ends to be suitable for being grasped from any direction and grasp the flexible object.

For example, a program including various instructions stored in a storage device such as the memory included in the grasping apparatus 1 is executed by a processor included in the grasping apparatus 1 so that the control unit 12; the training data acquisition unit 13; the learning calculation unit 14; the image data acquisition unit 16; the contact position determination unit 17; and the grasping position determination unit 18 are implemented. Further, the model storage unit 15 is composed of storage devices such as the memory included in the grasping apparatus 1. Note that the processor may be a CPU (Central Processing Unit), an MPU (Micro Processing Unit), a GPU (Graphics Processing Unit), or other types of processors. The memory may be a volatile memory or a nonvolatile memory.

Next, motions of grasping apparatus 1 will be described with reference to flowcharts.

Figure 5:
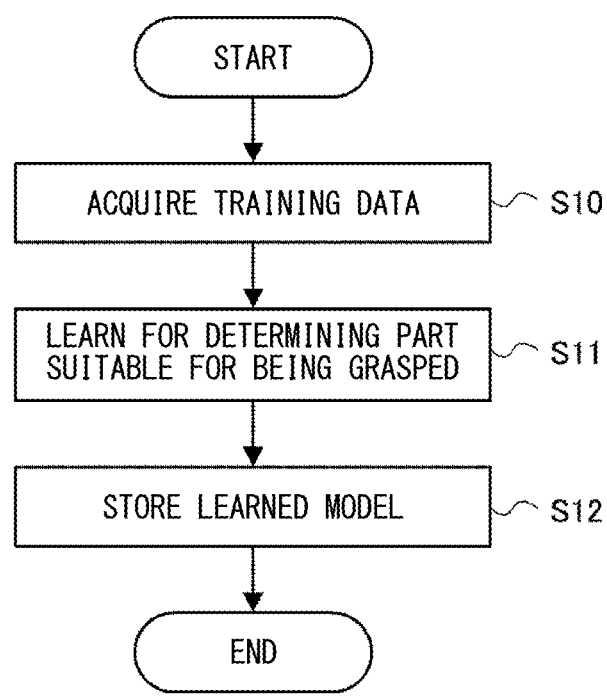
FIG. 5 is a flowchart showing a flow of a learning process performed by the grasping apparatus according to the embodiment.

FIG. 5 is a flowchart showing a flow of a learning process performed by the grasping apparatus 1.

In the learning process, the training data acquisition unit 13 firstly acquires training data in a step 10 (S10). The training data acquired in the step 10 includes the above-described first and second image data which have been associated with labels.

Next, in a step 11 (S11), the learning calculation unit 14 uses the training data acquired in the step 10 to perform a predetermined calculation for learning the CNN which determines a part suitable for being grasped.

Next, in a step 12 (S12), the model storage unit 15 stores the learned model whose parameter value is determined by the completion of the calculation performed in the step 11.

Figure 6:
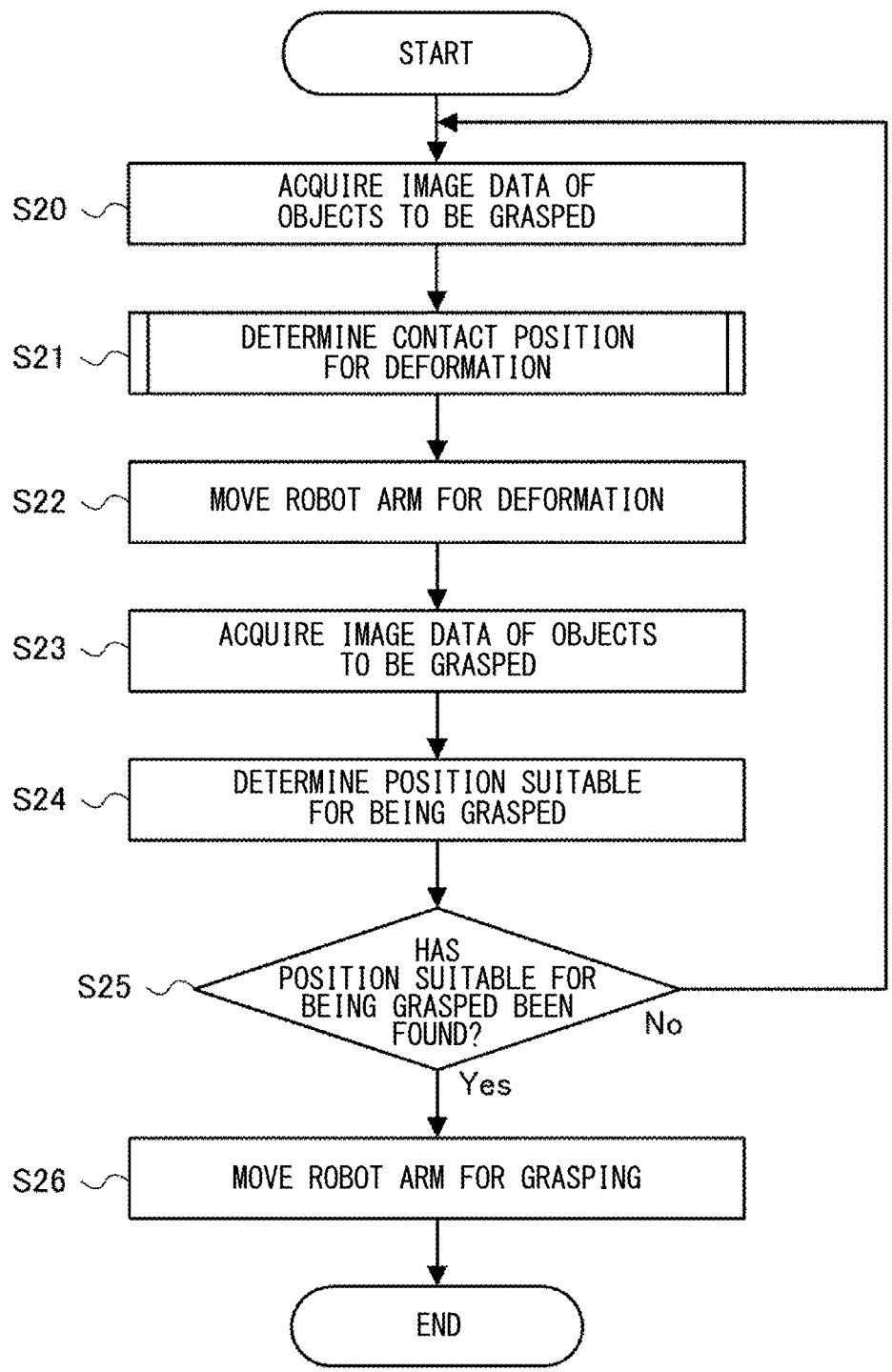
FIG. 6 is a flowchart showing a flow of a process performed when the grasping apparatus according to the embodiment grasps an object to be grasped.

FIG. 6 is a flowchart showing a flow of a process performed when the grasping apparatus 1 grasps an object to be grasped.

When a grasping is performed, in a step 20 (S20), the image data acquisition unit 16 firstly acquires image data of an object photographed by the image pickup device 10.

Next, in a step 21 (S21), the contact position determination unit 17 determines a contact position for deforming the flexible object to be grasped. In this embodiment, the contact position determination unit 17 specifically determines the contact position by processes shown in a flowchart of FIG. 7.

Figure 7:
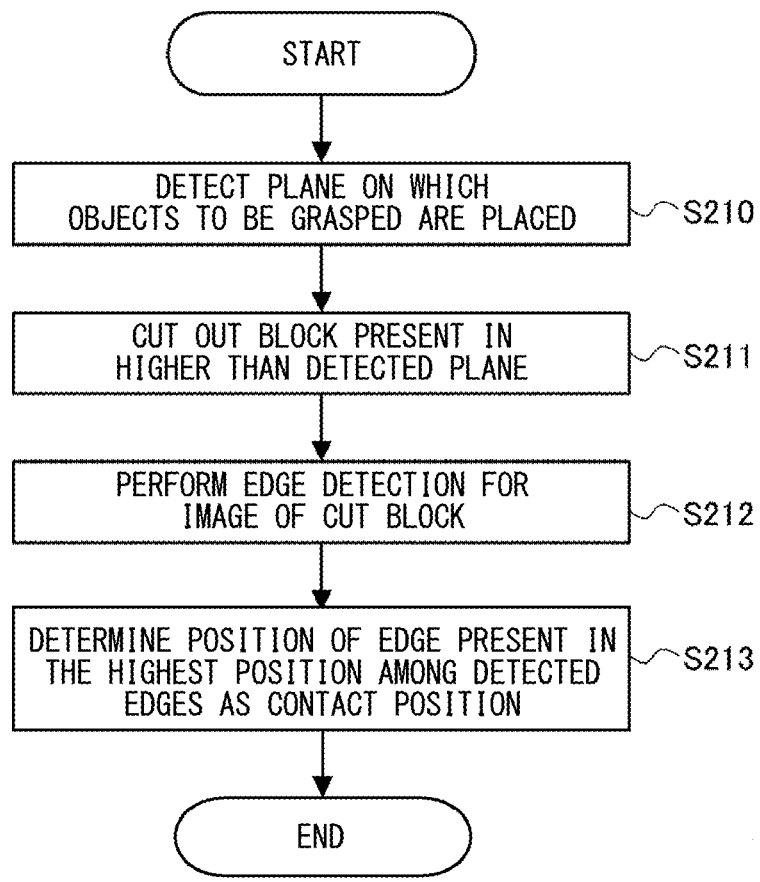
FIG. 7 is a flowchart showing details of S21 (i.e., a step S21, determination of a contact position) shown in FIG. 6.

The details of the processes carried out by the contact position determination unit 17 will be described hereinafter with reference to the flowchart of FIG. 7.

First, in a step 210 (S210), the contact position determination unit 17 detects a plane on which the flexible objects to be grasped are placed. That is, the contact position determination unit 17 performs a predetermined image analysis on image data acquired by the image data acquisition unit 16 to detect the plane.

Next, in a step 211 (S211), the contact position determination unit 17 performs an image analysis and thereby detects a block present in the side of the image higher than the plane detected in the step 210. Further, the detected block is cut out from that image.

Next, in a step 212 (S212), the contact position determination unit 17 performs a predetermined edge detection on the image of the block cut out in the step 211. The edges detected by this edge detection correspond to a contour of the objects to be grasped (the stacked flexible objects).

Next, in a step 213 (S213), the contact position determination unit 17 determines the ends of the upper surface of the stacked flexible objects as a contact position. For performing the above, the contact position determination unit 17 specifically determines a position of the edge present in the highest position (i.e., the uppermost position) of the positions among the edges detected in the step 212 as the contact position.

As described above, when the contact position is determined, the process proceeds to a step 22 (see FIG. 6).

Figure 8:
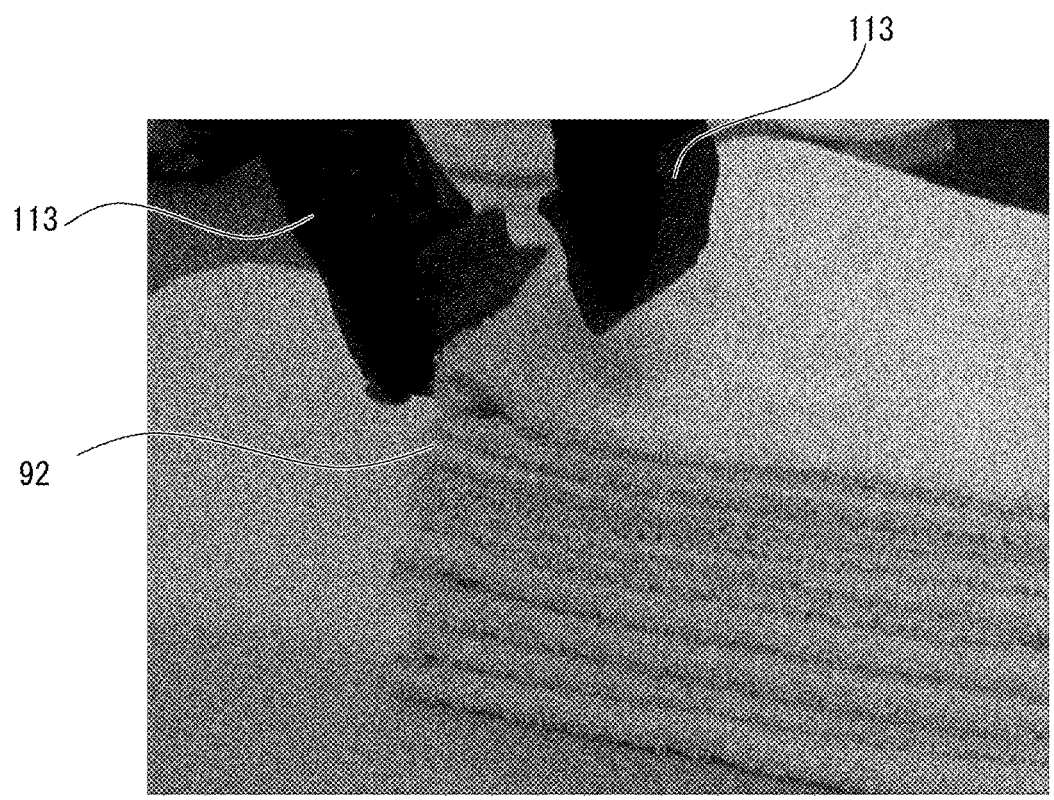
FIG. 8 shows a state in which the flexible object is pressed by an end effector.

In the step 22 (S22), for deforming the ends of the object to be grasped, the control unit 12 controls the robot arm 11 so that the end effector 113 presses the contact position determined in the step 21 from the lateral direction (see FIG. 8).

Next, in a step 23 (S23), the image data acquisition unit 16 acquires image data of the object photographed by the image pickup device 10. Note that in the image data acquired in the step 23, the object to be grasped, which has been deformed by the process of the step 22, is photographed. The deformation of cloth products or the like pressed by the end effector 113 is maintained even after the end effector 113 is released therefrom. Therefore, in the step 23, the image data photographed in a state where the end effector 113 is released from the flexible object may be acquired.

In a step 24 (S24), the grasping position determination unit 18 performs a determination on a position suitable for being grasped. That is, the grasping position determination unit 18 determines whether the part of the object to be grasped in the image data acquired in the step 23 is suitable for being grasped using the learned model. When a position suitable for being grasped has been found ("Yes" in a step 25 (S25)), the process proceeds to a step 26. When a position suitable for being grasped has not been found ("No" in the step 25), the process returns to the step 20. When the process returns to the step 20, for example, the processes performed after the step 20 are repeated for image data photographed from a direction different from the direction in the previous time. Thus, the determination on the position suitable for being grasped is similarly performed for the ends of the other sides.

In the step 26 (S26), for grasping the object to be grasped, the control unit 12 controls the robot arm 11 so that the end effector 113 holds the position determined to be suitable for being grasped in the step 24 from the lateral direction.

With the grasping apparatus 1 having the above-described configuration, when a grasping position is determined, ends of the top surface of the flexible object can be deformed by the robot arm 11. The deformed forms of the ends which are combined into one end are different from that of the ends which are not combined into one end. That is, the grasping position determination unit 18 performs a determination using image data showing a state which differs depending on whether or not a part is suitable for being grasped. Therefore, the grasping position determination unit 18 can determine a suitable grasping position. Further, the grasping apparatus 1 includes the above-described contact position determination unit 17. Therefore, it is possible to autonomously determine a contact position for the deformation. That is, in the grasping apparatus 1, the control unit 12 performs control according to a contact position determined by the contact position determination unit 17 so that the grasping apparatus 1 autonomously deforms the flexible object.

Note that the present disclosure is not limited to the above described embodiment and various modifications can be made without departing from the spirit of the present disclosure. For example, in the above embodiment, the grasping apparatus 1 includes all components shown in FIG. 3 and some of them may be included in other apparatuses. For example, a system as shown in FIG. 9 may be configured.

Figure 9:
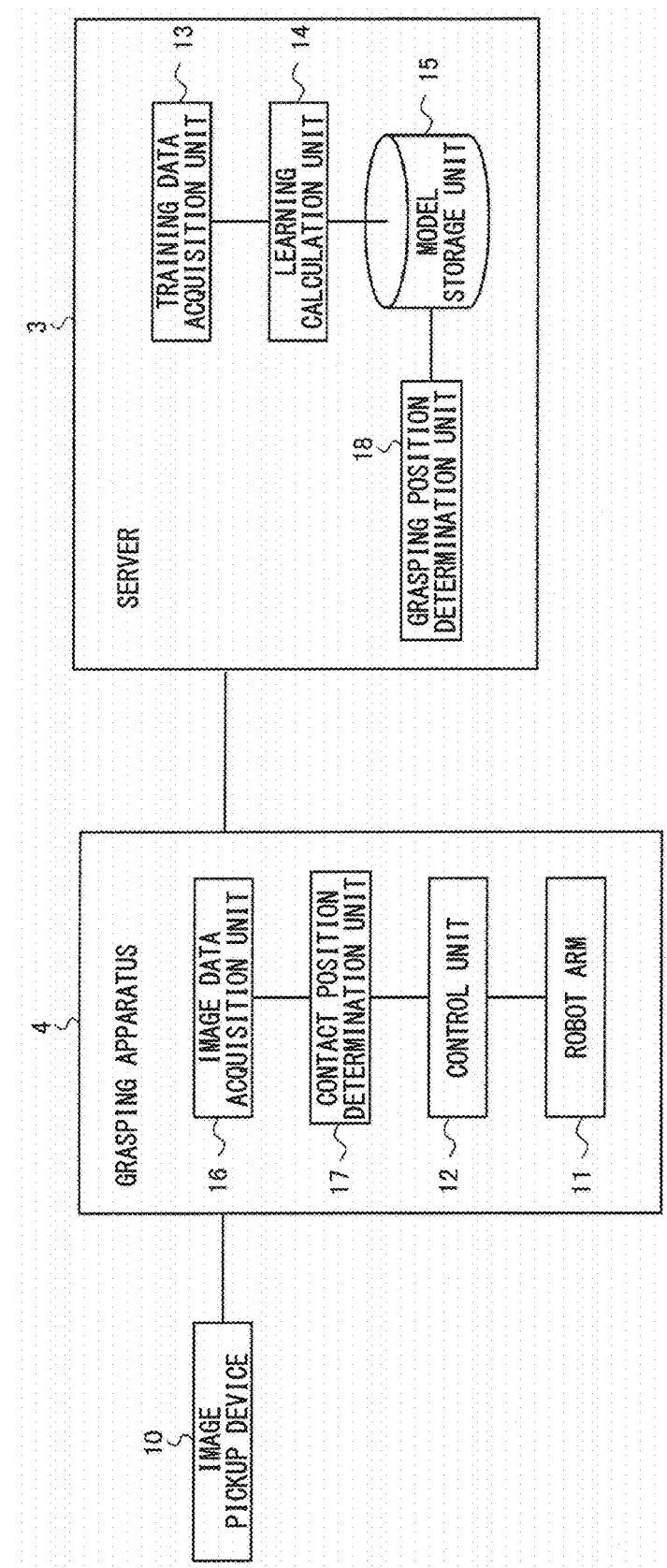
FIG. 9 is a schematic diagram showing a grasping system including an image pickup device, a server, and a grasping apparatus.

FIG. 9 is a schematic diagram showing a grasping system 2 including an image pickup device 10, a server 3, and a grasping apparatus 4. In the grasping system 2 shown in FIG. 9, the image pickup device 10 is installed in a space instead of in the grasping apparatus 4. Further, the server 3 includes the training data acquisition unit 13, the learning calculation unit 14, the model storage unit 15, and the grasping position determination unit 18 of the components shown in FIG. 3, and the other components shown in FIG. 3 are included in the grasping apparatus 4. In this case, for example, a program including various instructions stored in a storage device such as the memory included in the grasping apparatus 4 is executed by a processor included in the grasping apparatus 4 so that a control unit 12, an image data acquisition unit 16, and a contact position determination unit 17 are implemented. Further, for example, a program including various instructions stored in a storage device such as the memory included in the server 3 is executed by a processor included in the server 3 so that the training data acquisition unit 13, the learning calculation unit 14, and the grasping position determination unit 18 are implemented. Further, the model storage unit 15 is composed of storage devices such as the memory included in the server 3. Image data is transmitted and received between the image pickup device 10 and the grasping apparatus 4. That is, the image data acquisition unit 16 of the grasping apparatus 4 acquires image data, which are transmitted from the image pickup device 10 and received by the grasping apparatus 4. Further, between the server 3 and the grasping apparatus 4, image data necessary for a process performed by the grasping position determination unit 18 is transmitted and received, and a result of the process performed by the grasping position determination unit 18 is also transmitted and received.

Note that FIG. 9 shows an example of an apparatus which performs distributed processing, and other configurations or other apparatuses may be used for the distributed processing. A system is not limited to the configuration examples shown in FIGS. 3 and 9, and for example, it may be configured so that a server executes a process performed by the learning calculation unit 14 and a grasping apparatus executes a process performed by the grasping position determination unit 18. On the contrary, a system may be configured so that a grasping apparatus executes a process performed by the learning calculation unit 14 and a server executes a process performed by the grasping position determination unit 18.

The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A grasping apparatus, comprising:
    image data acquisition circuitry configured to acquire image data of a stack of flexible objects being photographed, the stack of flexible objects including a plurality of flexible objects in a stacked state and each flexible object in a folded state;

a grasping device configured to grasp a flexible object that is located on top of the stack of flexible objects; and control circuitry configured to:
prior to performance of a grasp operation on the flexible object that is located on top of the stack of flexible objects with a portion of the grasping device configured to come in contact with the flexible object that is located on top of the stack of flexible objects during the grasp operation, control a motion of the portion of the grasping device to deform ends of a top surface of the flexible object that is located on top of the stack of flexible objects by causing the portion of the grasping device to apply a pressing force from a side surface direction to the flexible object that is located on top of the stack of flexible objects;

acquire, using the image data acquisition circuitry, image data of the stack of flexible objects after the ends of the top surface of the flexible object that is located on top of the stack of flexible objects are deformed by the portion of the grasping device; and determine, using the image data of the stack of flexible objects in which the ends of the top surface of the flexible object that is located on top of the stack of flexible objects have been deformed by the portion of the grasping device, whether a part of the stack of flexible objects in the image data is suitable for being grasped with the portion of the grasping device according to the grasp operation.

2. The grasping apparatus according to claim 1, wherein the control circuitry is further configured to determine a contact position of the flexible object that is located on top of the stack of flexible objects in contact with the portion of the grasping device to deform the ends of the top surface of the flexible object that is located on top of the stack of flexible objects for the motion using image data of the stack of flexible objects before the ends of the top surface of the flexible object that is located on top of the stack of flexible objects are deformed according to the motion, wherein for deforming the ends of the top surface of the flexible object that is located on top of the stack of flexible objects, the control circuitry is further configured to control the grasping device such that the grasping device displaces the flexible object that is located on top of the stack of flexible objects in the determined contact position using the portion of the grasping device.

3. A learning apparatus, comprising:
control circuitry configured to:
acquire training data including image data of a stack of flexible objects being photographed, the stack of flexible objects including a plurality of flexible objects in a stacked state and each flexible object in a folded state; and perform calculation of machine learning using the acquired training data, wherein the image data includes first image data and second image data of the stack of flexible objects in which ends of a top surface of a flexible object that is located on top of the stack of flexible objects have been deformed from a regular stacked pattern shape by application of a pressing force from a side surface direction by a portion of a grasping device configured to come in contact with the flexible object that is located on top of the stack of flexible objects during a grasp operation prior to the grasp operation being performed on the flexible object that is located on the top of the stack of flexible objects by the portion of the grasping device, the first image data being image data of the ends, of the top surface of the flexible object that is located on top of the stack of flexible objects, that are combined into one end by folding the flexible object that is located on top of the stack of flexible objects, the second image data being image data of the ends, of the top surface of the flexible object that is located on top of the stack of flexible objects, that are not combined into one end by folding the flexible object that is located on top of the stack of flexible objects, and the control circuitry is further configured to calculate to learn a part of the flexible object that is located on top of the stack of flexible objects suitable for being grasped using the training data.

4. A non-transitory computer readable medium storing a learned model for causing a computer to execute a method comprising:

learning a weighting coefficient of a neural network constituting the learned model is learned using training data including image data of a stack of flexible objects being photographed, the stack of flexible objects including a plurality of flexible objects in a stacked state and each flexible object in a folded state, the image data including first image data and second image data of the stack of flexible objects in which ends of a top surface of a flexible object that is located on top of the stack of flexible objects have been deformed from a regular stacked pattern shape by application of a pressing force from a side surface direction by a portion of a grasping device configured to come in contact with the flexible object that is located on top of the stack of flexible objects during a grasp operation prior to the grasp operation being performed on the flexible object that is located on the top of the stack of flexible objects by the portion of the grasping device, the first image data being image data of the ends, of the top surface of the flexible object that is located on top of the stack of flexible objects, that are combined into one end by folding the flexible object that is located on top of the stack of flexible objects, the second image data being image data of the ends, of the top surface of the flexible object that is located on top of the stack of flexible objects, that are not combined into one end by folding the flexible object that is located on top of the stack of flexible objects; and performing a calculation according to the weighting coefficient for the image data of the stack of flexible objects that is input to an input layer of the neural network and output, from an output layer of the neural network, a quantified value indicating whether a part of the stack of flexible objects in the image data is suitable for being grasped from an output layer of the neural network.

5. A grasping system, comprising:
a camera configured to photograph surrounding objects;
a grasping apparatus including:
image data acquisition circuitry configured to acquire image data of a stack of flexible objects photographed by the camera, the stack of flexible objects including a plurality of flexible objects in a stacked state and each flexible object in a folded state;
a grasping device configured to grasp a flexible object that is located on top of the stack of flexible objects;
a control circuitry unit configured to:

prior to performance of a grasp operation on the flexible object that is located on top of the stack of flexible objects with a portion of the grasping device configured to come in contact with the flexible object that is located on top of the stack of flexible objects during the grasp operation, control a motion of the portion of the grasping device to deform ends of a top surface of the flexible object that is located on top of the stack of flexible objects by causing the grasping device to apply a pressing force from a side surface direction to the flexible object that is located on top of the stack of flexible objects, and acquire, using the image data acquisition circuitry, image data of the stack of flexible objects after the ends of the top surface of the flexible object that is located on top of the stack of flexible objects are deformed by the portion of the grasping device; and a server configured to determine, using the image data of the stack of flexible objects in which the ends of the top surface of the flexible object that is located on top of the stack of flexible objects have been deformed by the portion of the grasping device, whether a part of the stack of flexible objects in the image data is suitable for being grasped with the portion of the grasping device according to the grasp operation.

6. A method performed in a grasping apparatus, the method comprising:

prior to performance of a grasp operation on a flexible object that is located on top of a stack of flexible objects with a portion of a grasping device configured to come in contact with the flexible object that is located on top of the stack of flexible objects during the grasp operation, controlling a motion of the portion of the grasping device to deform ends of a top surface of the flexible object that is located on top of a stack of flexible objects by causing the portion of the grasping device to apply a pressing force from a side surface direction to the flexible object that is located on top of the stack of flexible objects, the stack of flexible objects including a plurality of flexible objects in a stacked state and each flexible object in a folded state;

acquiring, using image data acquisition circuitry, image data of the stack of flexible objects after the ends of the top surface of the flexible object that is located on top of the stack of flexible objects are deformed by the portion of the grasping device; and determining, using the image date of the stack of flexible objects in which the ends of the top surface of the flexible object that is located on top of the stack of flexible objects have been deformed by the portion of the grasping device, whether a part of the stack of flexible objects in the image data is suitable for being grasped with the portion of the grasping device according to the grasp operation.

7. A learning method, comprising:

acquiring training data including image data of a stack of flexible objects being photographed, the stack of flexible objects including a plurality of flexible objects in a stacked state and each flexible object in a folded state; and performing, using the acquired training data, calculation of machine learning to determine a part of the stack of flexible objects suitable for being grasped, wherein the image data includes first image data and second image data of the stack of flexible objects in which ends of a top surface of a flexible object that is located on top of the stack of flexible objects have been deformed from a regular stacked pattern shape by application of a pressing force from a side surface direction by a portion of a grasping device configured to come in contact with the flexible object that is located on top of the stack of flexible objects during a grasp operation prior to the grasp operation being performed on the flexible object that is located on the top of the stack of flexible objects by the portion of the grasping device, the first image data being image data of the ends, of the top surface of the flexible object that is located on top of the stack of flexible objects, that are combined into one end by folding the flexible object that is located on top of the stack of flexible objects, and the second image data being image data of the ends, of the top surface of the flexible object that is located on top of the stack of flexible objects, that are not combined into one end by folding the flexible object.

* * * * *